Sept. 16, 1924.                                                  1,508,985
J. R. McDERMET
METHOD AND APPARATUS FOR TREATING LIQUID
Filed Dec. 15  1923           2 Sheets-Sheet 2

Patented Sept. 16, 1924.

1,508,985

UNITED STATES PATENT OFFICE.

JOHN R. McDERMET, OF JEANNETTE, PENNSYLVANIA, ASSIGNOR TO ELLIOTT COMPANY, OF PITTSBURGH, PENNSYLVANIA, A CORPORATION OF PENNSYLVANIA.

METHOD AND APPARTUS FOR TREATING LIQUID.

Application filed December 15, 1923. Serial No. 680,923.

*To all whom it may concern:*

Be it known that I, JOHN R. McDERMET, a citizen of the United States, residing at Jeannette, county of Westmoreland, and State of Pennsylvania, have invented a new and useful Improvement in Methods and Apparatus for Treating Liquid, of which the following is a full, clear, and exact description.

The present invention relates broadly to the treatment of liquid for the purpose of effecting the removal therefrom of its entrained air. The invention contemplates the evaporation of a certain percentage of the liquid being handled, irrespective of variations in the amount of liquid, whereby a constant rate of evaporation is maintained.

While the invention is not limited in its applicability to any particular type of deaerating apparatus, it is particularly adapted for use with an apparatus of the character disclosed in Patent No. 1,457,153 of May 29, 1923, to W. S. Elliott. In that patent there is disclosed the idea of maintaining a definite temperature and pressure in an evaporating chamber, whereby a certain portion of the liquid is caused to change its phase. The heat employed in causing this change of phase is in turn preferably recovered and supplied to the liquid to be treated prior to the final heating thereof. In this manner, the heat released to effect the release of the contained air is reclaimed, thereby increasing the efficiency of the apparatus.

The present invention has for its object the control of the operating conditions of the apparatus in such manner that substantially uniform results may be obtained.

In the accompanying drawings, which are largely diagrammatic, there is shown, for purposes of illustration only, one embodiment of the present invention, it being understood that the drawings do not define the limits of my invention, as changes in the construction and operation therein disclosed may be made without departing from the spirit of the invention or scope of my broader claims.

Figure 1:
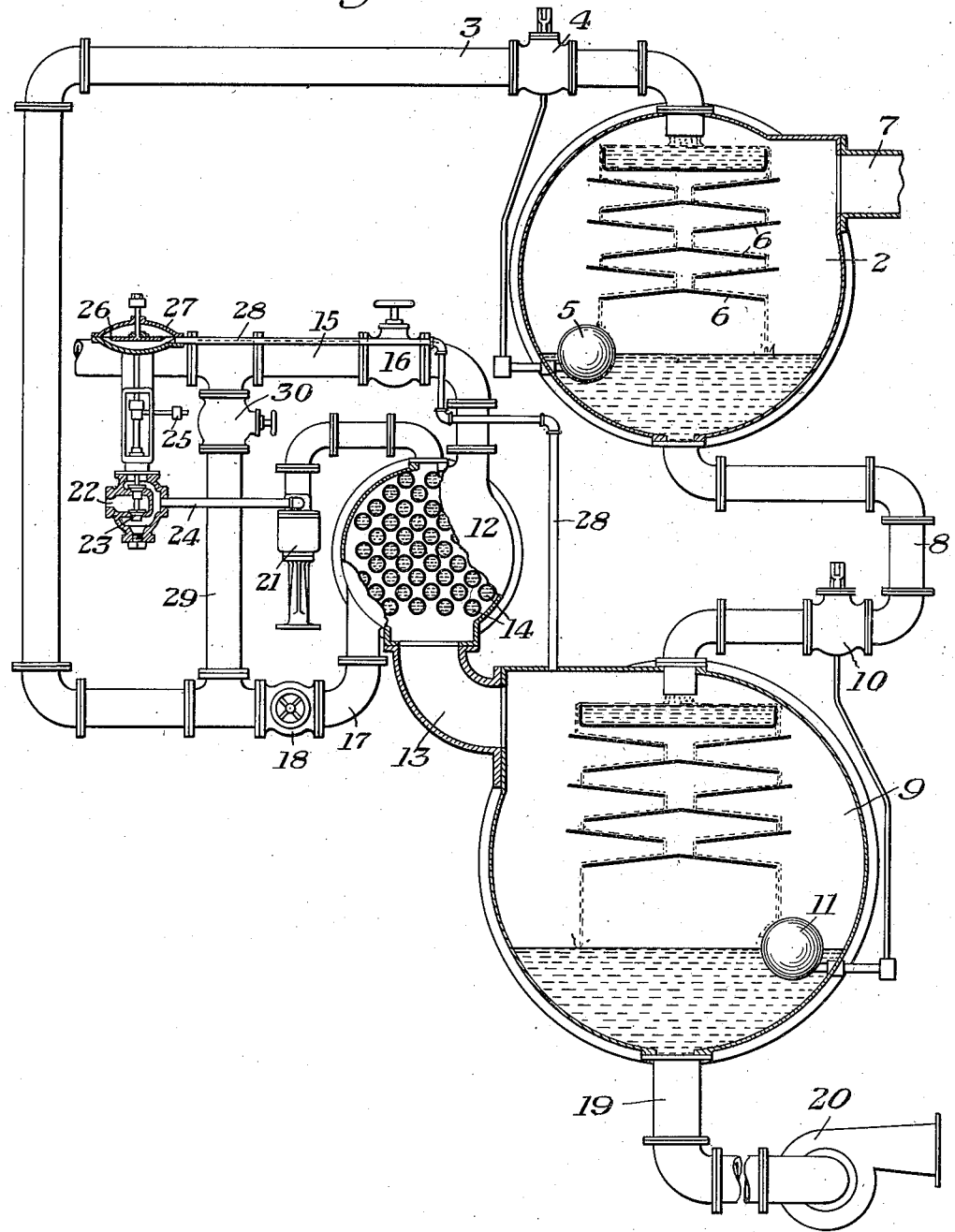
Figure 1 is a diagrammatic vertical transverse sectional view, certain of the parts being shown in elevation, through one form of apparatus embodying the invention.

In carrying out the present invention, there is provided means for supplying heat to the liquid, such as by means of a heater 2 having an inlet 3 for the liquid to be treated, the inlet being controlled automatically by a valve 4 connected to a float 5 in the body of the heater. The liquid entering through the inlet is effectively broken up by a series of agitating or cascading pans 6, whereby efficient heat interchange with steam supplied through the steam connection 7 is insured.

The liquid, after having been heated to the desired or predetermined temperature, passes through a connection 8 into an evaporating or separating chamber 9. The inlet of heated liquid into the chamber 9 is also preferably controlled by a valve 10 automatically operated by a float 11, in accordance with variations in the liquid level within the evaporating chamber. It is contemplated, in accordance with the present invention, that there be maintained a definite temperature and pressure in the chamber 9, and to that end there shall be maintained a definitely higher temperature in the heater 2 than is maintained in the evaporating chamber 9. In this manner, liquid passing the valve 10 at a definitely higher temperature than the temperature in the evaporating chamber is caused to violently boil or flash, thereby resulting in the change of phase or evaporation of a definite percentage of the liquid, irrespective of the volume being treated.

By the maintaining of definite conditions in the chamber 9 of the character set forth, whereby a constant change in phase or evaporation of a definite percentage of the liquid is insured, as claimed in the copending application of William S. Elliott, Serial No. 538,944, filed February 24, 1922, the release of a definite percentage of the entrained air is insured. For the purpose of removing the vapors released within the evaporating chamber, and condensing the same, there is provided a condenser 12 having its inlet connected to the evaporating chamber through a suitable connection 13. The condenser is preferably of the type having a plurality of tubes 14 therein, through which is adapted to be circulated in one or more passes the liquid to be treated. This liquid may be supplied through a connection 15 leading to one end of the tube or to one of the tube passes through a manually controlled valve 16, the liquid, after performing its condensing action, being withdrawn through a connection 17 having a manually controlled valve 18 therein. The connection 17 will lead to the inlet 3 of the heater 2. In this manner, assuming a difference in temperature of 25 degrees between the heater and the evaporating or separating chamber, there will be released in the separator 25 B.t.u.'s per pound of liquid handled. Assuming ideal efficiency, all of this heat released in the separator will be reclaimed in the condenser 12 and the temperature rise therein per pound of liquid will be exactly equal to the temperature drop in the separator per pound of liquid. This decreases the work of the heater 2, so that in reality its capacity is dependent upon its ability to heat the liquid through an amount corresponding to the temperature difference between the liquid entering the condenser through the connection 15 and the deaerated liquid leaving the separator through the connection 19. It will be apparent that the liquid is drawn from the separator as required, the withdrawal preferably being effected positively, as by means of a pump 20.

In the operation of apparatus of this character, it is desirable, fundamentality, to consider two factors, the first of these is the provision of a constant supply of liquid for passage to the pump 20, and the second the deaeration of all of the liquid supplied to the pump. It will be apparent that in the event the pressure in the separator decreases beyond a predetermined point, the pump will produce cavitation or churning and will not be effective for supplying the requisite amount of liquid. Not only is the supply of such an amount of liquid an important factor, but the temperature at which it is delivered is also of importance. This temperature may be considered as the operating temperature of the apparatus, and the term will hereinafter be used in this manner. On the other hand, in the event the percentage of evaporation within the separator should increase, the temperature in the separator would correspondingly increase, unless some means of preventing such an increase is provided. In the event of such an increase, the operating conditions, i. e., the relative temperatures in the heater and separator would change, and the rate of evaporation or change in phase would correspondingly vary. In the patent to R. N. Ehrhart No. 1,463,158 of July 21, 1923, there is disclosed means for maintaining a constant rate of evaporation by varying the effectiveness of an ejector. In that patent it is contemplated, however, that the total amount of steam supplied to the ejector shall at all times remain constant, a certain percentage of the steam, which varies in accordance with the temperature in the separator, being literally wasted in order to decrease the efficiency of the ejector.

In the patent to R. N. Ehrhart No. 1,401,116 of December 20, 1921, there is disclosed means for varying the efficiency of an ejector as the rate of condensation within the condenser exhausted thereby varies. In this patent also, however, the total amount of steam utilized by the ejector remains constant, irrespective of its operating efficiency.

In the patent to R. N. Ehrhart No. 1,401,100 of December 20, 1921, there is disclosed means dependent upon the rate of condensation within a condenser for controlling the amount of cooling liquid supplied thereto, it being contemplated that any amount of liquid necessary to the operation of the apparatus, in addition to that passing through the condenser, shall be supplied through a by-pass.

The patents referred to disclose means for varying the operation of the air ejecting means and means for controlling the operation of the condenser which withdraws the vapors from the separator. The present application provides means of an improved character for accomplishing changes both in the capacity of the air ejecting means and in the capacity of the condenser, whereby the desired operating temperature may be maintained without any possibility of an increase in the vacuum in the separator to a point effective for cutting off the supply of deaerated liquid. In this manner, accurate control of the apparatus is made possible.

In accordance with the present invention, there is provided an ejector 21 which is operatively connected to the vapor space in the condenser 12 for withdrawing any condensable gases therefrom. The steam for operating the ejector is supplied from an inlet 22 leading through a balanced valve 23 to a steam connection 24. The construction of the valve is preferably such that it is normally urged upwardly to unseat the valves by means of a counterweight 25. This tendency is in turn resisted by the operation of a diaphragm 26 mounted within a suitable chamber 27, the lower side of which is in communication, through a line 28, with the interior of the separator, the upper side being open to atmospheric pressure. Due to this construction, it will be apparent that a drop in the temperature or pressure within the separator will result in a movement of the diaphragm downwardly, thereby tending to cut off the supply of steam to the ejector. This in turn will decrease its capacity and tend to prevent an increase in the vacuum within the separator. On the other hand, in the event of an increase in the temperature or pressure conditions existing within the separator, the counterweight will tend to unseat the valve, thereby supplying more steam to the ejector for the purpose of increasing its capacity. This increase in the capacity of the ejector exerts a greater ejecting action, thereby tending to exhaust non-condensable gases from the condenser 12, and at the same time tending to draw more vapors into the condenser. This operation tends to lower the temperature and pressure in the separator before the operating temperature of the apparatus rises. It is the purpose of this ejector control to operate in this manner to tend to prevent any increase in the operating temperature. The direct action of the ejector at this time is augmented by the increase in capacity of the condenser by reason of the decrease in the air tension therein. In other words, the increased efficiency or capacity of the ejector serves to prevent air from blanketing the cooling surface of the tubes and alters the actual operating temperatures within the condenser by substitution of steam pressure for partial air pressures, thus increasing the total over-all temperature of the mixture, and hence the heat gradient over the condensing surface.

The condenser capacity, meaning by this the ability of the condenser to condense steam into water or its ability to transmit a certain amount of heat as evolved in the condensation process, may be considered as dependent first upon a conductivity factor; second upon the number of square feet of condenser surface available, and third the temperature difference between the steam and the cooling medium. The conductivity factor depends principally upon the cleanliness of the surface, the degree of air exhaustion and the velocity of the sweep of vapors within the condensing chamber. It is this factor which is influenced by the change in the efficiency or capacity of the ejector. It will be apparent that the number of square feet of surface area available is necessarily fixed by the design of the particular apparatus, and is not susceptible of convenient change during the operation thereof. The temperature difference between the steam and cooling mediums is the heating head across the condensing surface tending to produce a gradient to permit heat conduction.

From the foregoing, it will be understood that the condenser capacity may be expressed by the following formula: Condenser capacity=conductivity $x$ temperature gradient $x$ area. As pointed out, the area is fixed and the conductivity is determined by the operation of the ejector. The only element, therefore, remaining and capable of control to change condenser capacity is the temperature gradient. This temperature gradient may otherwise be expressed as the difference between the temperature of the vapor and the average of the temperature of the liquid entering the condenser and the temperature of the liquid leaving the condenser. This average may be roughly expressed as the arithmetic mean, or $$\frac{t^1 + t^2}{2}$$

where
$t^1$=temperature of liquid supplied to the condenser.
$t^2$=temperature of liquid leaving the condenser through the connection 17.

It will be apparent that if a definite operating temperature is maintained, variations in the load or amount of liquid being treated will not produce any change in the difference between $t^1$ and $t^2$, as the amount of heat released in the separator is simply interchanged with the cooling liquid passing through the condenser. Where a closed heater is used, so that the steam condensed in heating the liquid is not added to the liquid being treated, the quantity of liquid passing through the condenser is exactly equal to the amount of liquid going through the evaporating chamber. In other words, the condenser in such cases has a constant circulation ratio of liquid to heat, providing the temperature in the heating and evaporating chambers is maintained constant. Where, as in the embodiment of the invention illustrated, an open heater is utilized, steam is added to the liquid through the process of condensation, and the quantity rises slightly. This circulation ratio is, however, as pointed out, invariable irrespective of the load or quantity of liquid being treated. Since the condensing and evaporating chamber are in series, a change in the quantity of liquid handled at one point is evidently followed by a change in the quantity handled at the other.

There is, however, one factor in connection with the operation of the condenser and having to do with the temperature gradient which may be controlled to vary the condenser capacity, and this resides in the temperature of the liquid initially supplied to the condenser. If the entering temperature $t^1$ of the liquid be reduced, by natural causes or seasonable variations, and the heat rise through the condenser pass is maintained constant, the average temperature will be reduced and the capacity of the condenser increased. Such a change in capacity as is occasioned by seasonable variations in the temperature of the liquid supplied, may exceed the regulating capacity of the ejector controlling means, making it necessary to provide additional means of control. This may be accomplished by providing a by-pass 29 around the condenser 12 and communicating with the inlet 15 and the outlet 17, the by-pass being controlled by a valve 30. By this construction, as the temperature of the supplied liquid drops, the valve 30 may be correspondingly opened to by-pass more liquid around the condenser. This will result in a correspondingly smaller quantity through the condenser and a correspondingly greater rise in the temperature of this smaller amount of liquid whereby a uniform temperature gradient over the condensing surface is maintained. This permits the apparatus to be easily controlled over seasonable variations within the regulating capacity of the air ejector controlling means. It will further be apparent that this method of condenser capacity control does not alter the essential relationship between the heat evolved in the evaporating chamber and that abstracted in the condenser, due to the fact that in the condenser there is a plurality of liquid passes in which the hydraulic losses due to friction are much greater than in the straight by-pass connection 29. As a result, it is not necessary to manually operate the valves 16 and 18, but merely the valve 30, the friction determining the relative flow through the different paths provided.

With the construction herein described, it will be apparent that if the operator supplies the apparatus a quantity of heat in excess of that for which it is designed, thereby resulting in an increased evaporation within the evaporating chamber, the controlling means for the ejector operates to develop maximum capacity for the ejector and also for the condenser, due to the change effected in the conductivity factor. This maximum capacity of both ejector and condenser is developed, where an excess of heat is supplied, before the operating temperature rises and tends to prevent any rise in such temperature.

In the event too small a quantity of heat is supplied to maintain the specified operating conditions, the operating temperature must inevitably fall as the apparatus has no capacity within itself to produce heat, and its operation depends upon heat interchange between the evaporator and condenser. Under such conditions, the operating pressure in the evaporating chamber tends to balance the heat supply. This decrease in the operating pressure tends to cut off, by means of the diaphragm 26 and valve 22, the supply of steam to the ejector, whereby its capacity is decreased and the production of a vacuum higher than the definite minimum absolute pressure necessary for the efficient withdrawal of deaerated liquid, is prevented.

It has, of course, been assumed that during the operation of the apparatus, the air tensions in the evaporating chamber are substantially zero, and that, therefore, the operating pressure in the evaporating chamber is exactly a function of the temperature. Such a relationship is desirable for the successful operation of the apparatus for deaeration purposes.

Coupled with the air injector control mechanism is the means for varying the supply of cooling liquid to the condenser as the temperature $t^1$ varies, while maintaining a total constant increase in the temperature of the liquid stream leaving the connection 15.

As a specific illustration, let it be assumed that the temperature $t^1$ is 80 and the temperature $t^2$ 105, the average will be 92½. If the temperature in the evaporator is 180 degrees, the temperature gradient in the condenser will be 87½ degrees. As pointed out, the total increase in the temperature of the liquid flowing through the condenser is substantially equal to the heat released in the evaporator, and this has been assumed as 25 B. t. u.'s per pound of liquid handled. If the temperature $t^1$ should drop to 40 degrees and all the liquid should continue to flow through the condenser, the temperature $t^2$ would be 65 degrees. This would give an average of 52½ degrees, thereby increasing the temperature gradient by 35 degrees and correspondingly increasing the condenser capacity. In order to counteract this, I propose by-passing sufficient of the liquid whereby the temperature of the relatively smaller amount of liquid passing through the condenser will be correspondingly increased. Preferably the proportions will be such that the temperature $t^2$ will be 145 degrees, thus reestablishing the temperature gradient of 87½ degrees, and bringing the condenser back to the desired operating capacity. It will, of course, be understood that the maximum temperature $t^2$ can never exceed the temperature existing within the evaporator.

Figure 2:
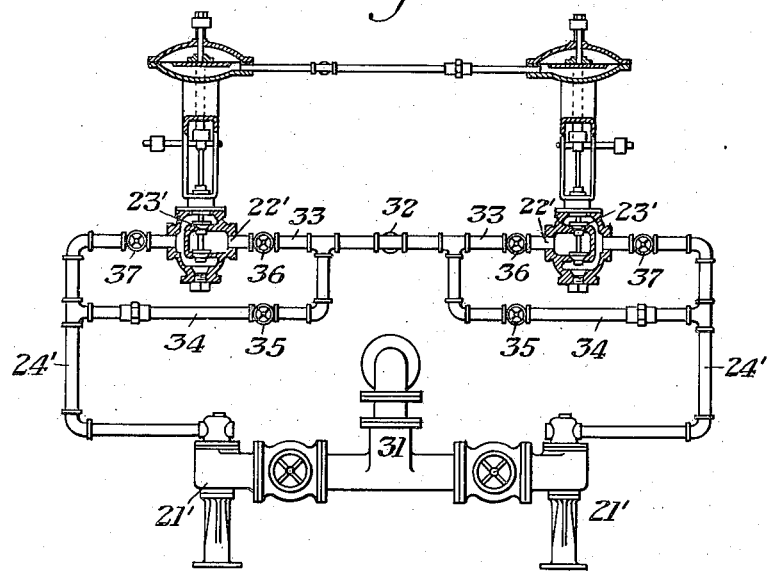
Figure 2 is a detail view illustrating certain of the connections slightly modified.
Figure 3:
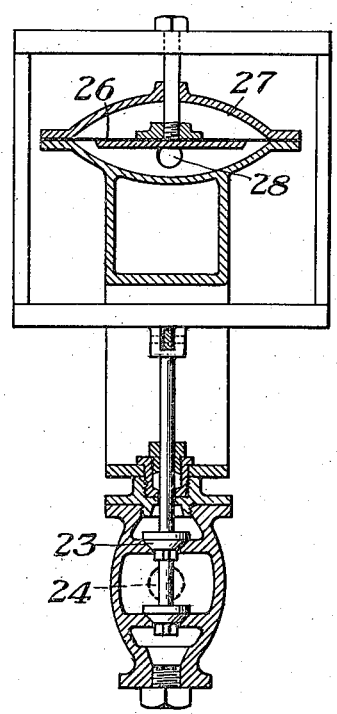
Figure 3 is a detail sectional view illustrating one form of controlling means.

In Figure 2 of the drawings there is illustrated one manner of connecting a plurality of ejectors and control valves for exhausting a single condenser. In this figure there are shown two ejectors 21' having a common vapor connection 31 with the condenser to be exhausted. Each of the ejectors has a steam connection 24' leading to a balanced valve 23' of the character described. The inlets 22' of these valves are connected to a common source of steam supply 32 through branches 33. With this construction, it will be apparent that the two ejectors operate in parallel to exhaust the released vapor and gases from the evaporator.

Throughout the foregoing specification it has been assumed that the apparatus is continuously operating under some load, so that the ejectors are functioning at all times to maintain a continuous vacuum in the evaporator. At times the apparatus may simply stand by for a period of time. Under such conditions there would be no vapors evolved in the evaporator and the ejector would cease to function. As there is no mechanical check valve in an ejector capable of preventing back flow therethrough, it becomes apparent that during such stand by periods air would tend to flow back through the ejector into the evaporator. This would increase the absolute pressure in the evaporator, thereby opening the control valves to supply more steam to the exhausting ejector, thereby producing a greater evacuation than desired. As a result, the entire system would continuously oscillate. In order to prevent such a condition, I may provide a by-pass 34 for each of the control valves, these by-passes having valves 35 by means of which the normal flow therethrough may be varied. This insures a definite minimum steam flow to the ejectors at all times, which flow is so proportioned that a predetermined vacuum may be maintained at all times, when no load is being handled, independently of the automatically operated control valves.

Suitable valves 36 and 37 may be provided on opposite sides of each of the ejectors to permit cutting them off for repairs as may be required. The valves 16 and 18 on opposite sides of the condenser 12 may be used in the same manner.

With the present apparatus it will be obvious that the amount of steam utilized by the ejectors is always the minimum required for a given capacity, thus conserving steam to the utmost. This constitutes a practical advantage of the present invention.

The system of ejector control is such that it is operative to produce maximum ejector capacity and condenser conductivity before any rise in the operating temperature. This tends to maintain a constant absolute pressure in the evaporator and consequent constant percentage rate of evaporation, whereby uniform deaeration of the liquid is obtained. At the same time, the control functions to prevent such a decrease in the absolute pressure that the supply of deaerated liquid is cut off. These constitute important operating advantages of the apparatus.

Further advantages arise from the provision of means preventing any increase in the absolute minimum pressure during periods of stand by.

Still further advantages arise from the provision in a single apparatus of means for controlling the temperature gradient in a condenser to regulate its capacity in combination with means for controlling the ejector capacity. This makes the apparatus operable over all reasonable changes in heat supplied to the apparatus, irrespective of variations in the temperature of the supplied liquid.

I claim:

1. In an apparatus for treating liquid, a chamber adapted to have a predetermined pressure maintained therein, a condenser communicating with said chamber, a steam ejector for withdrawing non-condensable gases from the condenser, and means for varying the total amount of steam to said ejector in accordance with variations in the pressure in said chamber.

2. In an apparatus for treating liquid, a chamber adapted to have a predetermined pressure maintained therein, a condenser communicating with said chamber, a steam ejector for withdrawing non-condensable gases from the condenser, and pressure operated means for varying the total steam to said ejector in accordance with variations in the pressure in said chamber.

3. In an apparatus for treating liquid, a chamber adapted to have a predetermined pressure maintained therein, a condenser communicating with said chamber, a steam ejector for withdrawing non-condensable gases from the condenser, means for varying the capacity of said ejector, and means for maintaining a predetermined minimum capacity for said ejector at all times.

4. In an apparatus for treating liquid, an evaporating chamber adapted to have a predetermined pressure maintained therein, means for supplying heat and liquid to said chamber to cause the evaporation of a definite percentage of the liquid, a condenser communicating with said chamber, a steam ejector for withdrawing non-condensable gases from the condenser, and means for varying the total steam to said ejector in accordance with variations in the pressure in said chamber before the temperature of the liquid leaving the chamber varies.

5. In an apparatus for treating liquid, a separating chamber adapted to have a predetermined pressure maintained therein, means for feeding liquid to said chamber, means for supplying heat to an amount to change the phase of said liquid to a percentage sufficient to release substantially all of the air contained therein, a condenser communicating with said chamber, a steam ejector for withdrawing non-condensable gases from the vapor space of the condenser, and means controlled by variations in the absolute pressure in said chamber for varying the total steam to said ejector to vary the capacity of said ejector before the operating temperature of the apparatus varies.

6. In an apparatus for treating liquid, a chamber adapted to have a predetermined pressure maintained therein, a condenser communicating with said chamber, means for withdrawing non-condensable gases from the condenser, and means for separately varying the capacity of said means and said condenser to maintain the desired condenser capacity.

7. In an apparatus for treating liquid, an evaporating chamber adapted to have a predetermined pressure maintained therein, a condenser communicating with said chamber, means for withdrawing non-condensable gases from the condenser, controlling means for varying the capacity of said withdrawing means in accordance with variations in the pressure within the chamber, and means for varying the temperature gradient of the condenser to maintain the capacity thereof within the regulating capacity of the non-condensable gas withdrawing means.

8. In apparatus for deaerating liquid, a chamber adapted to have a predetermined pressure maintained therein, means for feeding liquid to the chamber, means for supplying heat to the liquid to an amount to change the phase thereof to a percentage sufficient to release substantially all the air contained therein, a condenser communicating with the vapor space of said chamber, means for withdrawing non-condensable gases from the vapor space of the condenser, controlling means for separately varying the capacity of said ejector and said condenser, and means for passing the liquid to be treated through said condenser whereby the heat released by said change in phase is recovered in the condenser.

9. In an apparatus for treating liquid, a heater, a source of heat communicating with said heater, a separator, means for supplying liquid to the heater, means for supplying heated liquid to the separator, a condenser and ejector communicating with said separator to maintain a predetermined pressure therein, and means for separately varying the capacity of both the condenser and the ejector.

10. In an apparatus for treating liquid, a heater, a source of heat communicating with said heater, a separator, means for supplying liquid to the heater, means for supplying heated liquid to the separator, a condenser and ejector communicating with said separator to maintain a predetermined pressure therein, means for varying the capacity of the ejector and to change the conductivity of the condenser, and means for varying the temperature gradient of the condenser.

11. In an apparatus for treating liquid, a heater, a source of heat communicating with said heater, a separator, means for supplying liquid to the heater, means for supplying heated liquid to the separator, a condenser and ejector communicating with said separator to maintain a predetermined pressure therein, means automatically operable in accordance with variations in the pressure within the separator for varying the capacity of said ejector and to change the conductivity of the condenser, and means for varying the temperature gradient of the condenser.

12. In an apparatus for treating liquid, a heater, a source of heat communicating with said heater, a separator, means for supplying liquid to the heater, means for supplying heated liquid to the separator, a condenser and ejector communicating with said separator to maintain a predetermined pressure therein, means for separately varying the capacity of both the condenser and the ejector, and means for maintaining a predetermined minimum ejecting capacity for the ejector.

13. In an apparatus for treating liquid, a heater, a souce of heat communicating with said heater, a separator, means for supplying liquid to the heater, means for supplying heated liquid to the separator, a condenser and ejector communicating with said separator to maintain a predetermined pressure therein, means for varying the capacity of the ejector and to change the conductivity of the condenser, means for varying the temperature gradient of the condenser, and means for maintaining a predetermined minimum ejecting capacity for the ejector.

14. In an apparatus for treating liquid, a heater, a source of heat communicating with said heater, a separator, means for supplying liquid to the heater, means for supplying heated liquid to the separator, a condenser and ejector communicating with said separator to maintain a predetermined pressure therein, means automatically operable in accordance with variations in the pressure within the separator for varying the capacity of said ejector and to change the conductivity of the condenser, means for varying the temperature gradient of the condenser, and means for maintaining a predetermined minimum ejecting capacity for the ejector.

15. In the method of operating condensers, the step consisting in bypassing a portion of the supply of cooling liquid to the condenser as the temperature of the cooling liquid supplied to the condenser varies to thereby maintain a desired temperature gradient in the condenser.

16. In the method of deaerating liquid, the steps consisting in feeding liquid to a chamber in a partially continuous manner determined by the demand for deaerated liquid and adding sufficient heat thereto to change the phase of the liquid to a percentage sufficient to release substantially all of the air contained therein, passing the vapors formed in said chamber to a condenser, and varying the supply of cooling liquid to the condenser as the temperature of the cooling liquid supplied to the condenser varies to maintain a desired temperature gradient.

17. In the method of operating condensers, the steps consisting in varying the supply of cooling liquid to the condenser as the temperature of the cooling liquid supplied thereto varies to maintain a desired temperature gradient, and changing the conductivity of the condenser to vary its capacity.

18. In the method of operating condensers, the steps consisting in varying the supply of cooling liquid to the condenser as the temperature of the cooling liquid supplied thereto varies to maintain a desired temperature gradient, and reducing the air tension within the condenser to vary the capacity thereof.

19. In the method of deaerating liquid, the steps consisting in changing the phase of a definite percentage of the liquid, passing the vapors to a condenser, withdrawing the non-condensable gases from the condenser, controlling the effectiveness of the gas withdrawing means, and separately varying the condenser capacity to maintain the same within the capacity of the control of the gas withdrawing means.

20. In the method of deaerating liquid, the steps consisting in changing the phase of a definite percentage of the liquid, passing the vapors to a condenser, withdrawing the non-condensable gases from the condenser, controlling the effectiveness of the gas withdrawing means, and separately varying the temperature gradient of the condenser.

21. In the method of deaerating liquid, the steps consisting in changing the phase of a definite percentage of the liquid passing the vapors to a condenser, venting the non-condensable gasses from the condenser, and varying the temperature gradient of the condenser as the temperature of the liquid supplied to the condenser varies.

22. In the method of deaerating liquid, the steps consisting in changing the phase of a definite percentage of the liquid, passing the vapors to a condenser, ejecting the non-condensable gases from the condenser by an ejection fluid stream, and changing the volume of the ejecting fluid stream to vary its ejecting capacity.

23. In the method of deaerating liquid, the steps consisting in changing the phase of a definite percentage of the liquid, passing the vapors to a condenser, ejecting the non-condensable gases from the condenser by an ejecting fluid stream, changing the volume of the ejecting fluid stream to vary its ejecting capacity and the conductivity of the condenser, and varying the temperature gradient of the condenser.

24. In the method of deaerating liquid, the steps consisting in passing the liquid to a chamber, changing the phase of a definite percentage of the liquid therein, passing the vapors to a condenser, condensing the vapors therein by the liquid to be treated prior to its passage to said chamber, and maintaining the temperature gradient of the condenser and the total change in the temperature of the liquid supplied to said chamber substantially constant by varying the quantity of liquid passed through the condenser as the temperature of the liquid passing to the condenser varies.

25. In the method of deaerating liquid, the steps consisting in passing the liquid to a chamber, changing the phase of a definite percentage of the liquid therein, passing the vapors to a condenser, condensing the vapors therein by the liquid to be treated prior to its passage to said chamber, maintaining the temperature gradient of the condenser and the total change in the temperature of the liquid supplied to said chamber substantially constant by varying the quantity of liquid passed through the condenser as the temperature of the liquid passing to the condenser varies, and varying the conductivity of the condenser by changing the rate of removal of non-condensable gases therefrom.

In testimony whereof I have hereunto set my hand.

JOHN R. McDERMET.